(12) United States Patent
Haselmeier et al.

(10) Patent No.: US 9,394,691 B2
(45) Date of Patent: Jul. 19, 2016

(54) FLOOR PANEL WITH INTEGRATED CABLE CHANNEL

(71) Applicant: Airbus Operations GmbH, Hamburg (DE)

(72) Inventors: Jan Haselmeier, Hemmoor (DE); Michael Bahs, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 319 days.

(21) Appl. No.: 13/926,474

(22) Filed: Jun. 25, 2013

(65) Prior Publication Data

US 2013/0340364 A1    Dec. 26, 2013

Related U.S. Application Data

(60) Provisional application No. 61/664,295, filed on Jun. 26, 2012.

(30) Foreign Application Priority Data

Jun. 26, 2012 (EP) ...................................... 12173636

(51) Int. Cl.
| | |
|---|---|
| *B64D 11/06* | (2006.01) |
| *E04C 2/52* | (2006.01) |
| *B64C 1/18* | (2006.01) |
| *B64D 11/00* | (2006.01) |
| *H02G 3/38* | (2006.01) |

(52) U.S. Cl.
CPC ... *E04C 2/52* (2013.01); *B64C 1/18* (2013.01); *B64D 11/0015* (2013.01); *H02G 3/383* (2013.01); *Y02T 50/46* (2013.01)

(58) Field of Classification Search
CPC ........ B64C 1/18; B64D 11/0015; E04C 2/52; H04G 3/383
USPC ........ 52/220.1; 244/118.5, 119, 120; 361/218
See application file for complete search history.

(56) References Cited

U.S. PATENT DOCUMENTS

| | | | |
|---|---|---|---|
| 6,527,566 | B1 | 3/2003 | Lambiaso |
| 6,824,104 | B2 * | 11/2004 | Smallhorn ................. 244/118.5 |
| 7,182,291 | B2 * | 2/2007 | Westre et al. ................. 244/119 |

(Continued)

FOREIGN PATENT DOCUMENTS

| | | |
|---|---|---|
| CN | 1348242 A | 5/2002 |
| CN | 102060099 A | 5/2011 |

OTHER PUBLICATIONS

European Searching Authority, European Search Report for Application No. 12173636.7 Mailed Nov. 15, 2012.

(Continued)

*Primary Examiner* — James Buckle, Jr.
(74) *Attorney, Agent, or Firm* — Ingrassia Fisher & Lorenz, P.C.

(57) ABSTRACT

A floor panel for a floor of a passenger cabin of a mobile platform is provided, which comprises a base body with an integrated cable channel and a cover element covering the cable channel. The base body is realized in the form of a sandwich component including two honeycomb structures, between which the cable channel is arranged. The cover element is firmly attached to the base body, thereby creating a self-supporting floor panel. Since the cover element is firmly attached to the base body, the thickness and weight of the base body may be reduced.

15 Claims, 6 Drawing Sheets

(56) References Cited

U.S. PATENT DOCUMENTS

| | | | |
|---|---|---|---|
| 7,185,850 B2* | 3/2007 | Callahan et al. | 244/118.6 |
| 7,191,981 B2* | 3/2007 | Laib et al. | 244/118.6 |
| 7,207,523 B2* | 4/2007 | Callahan et al. | 244/118.6 |
| 8,366,042 B2 | 2/2013 | Haselmeier et al. | |
| 8,899,521 B2* | 12/2014 | Delahaye et al. | 244/119 |
| 2003/0106962 A1 | 6/2003 | Smallhorn | |
| 2006/0202084 A1* | 9/2006 | Smallhorn | 244/118.5 |
| 2007/0018045 A1* | 1/2007 | Callahan et al. | 244/118.6 |
| 2007/0194175 A1 | 8/2007 | Kismarton et al. | |
| 2009/0184199 A1* | 7/2009 | Leisten et al. | 244/1 A |
| 2010/0213314 A1* | 8/2010 | Haselmeier et al. | 244/119 |

OTHER PUBLICATIONS

State Intellectual Property Office of the People's Republic of China, Office Action in Chinese Patent Application No. 201310280270.8 mailed Mar. 2, 2015.

* cited by examiner

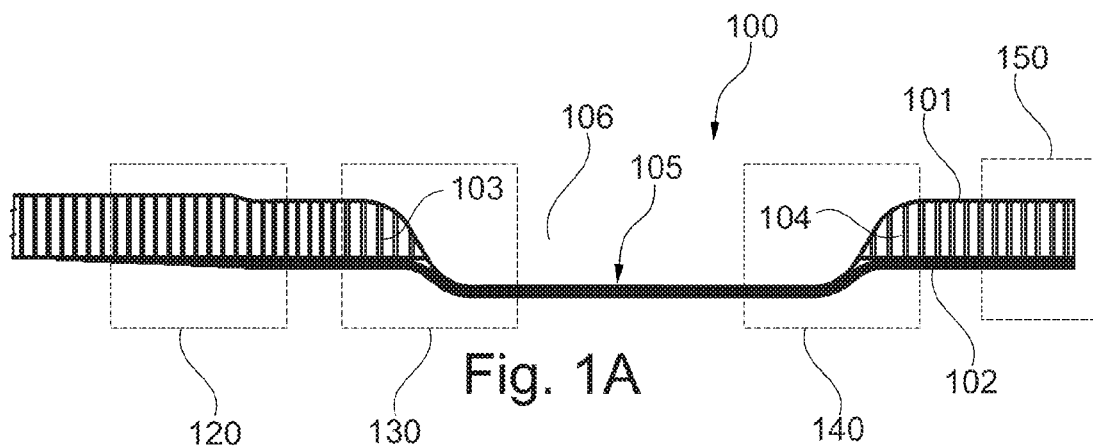
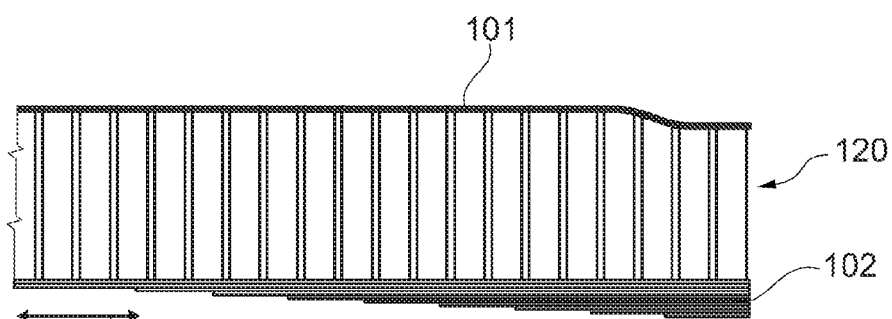
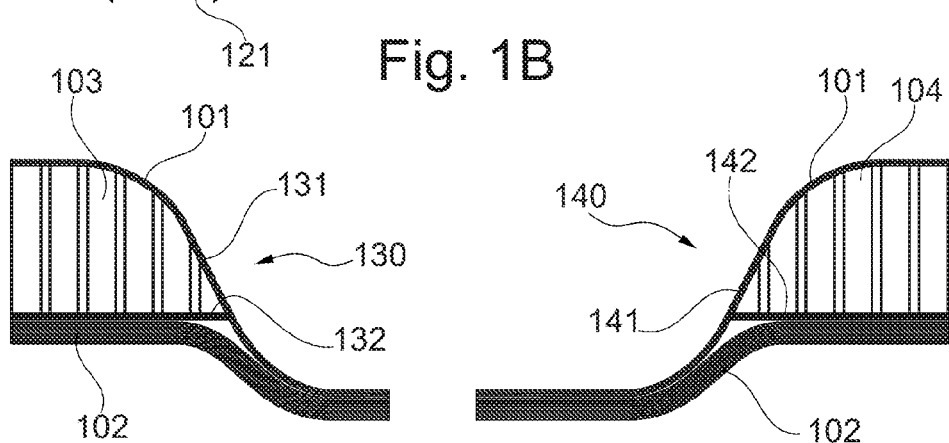
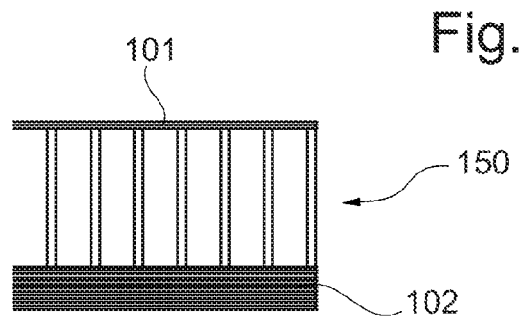
Fig. 1A
Fig. 1B
Fig. 1C
Fig. 1D
Fig. 1E

FLOOR PANEL WITH INTEGRATED CABLE CHANNEL

CROSS-REFERENCE TO RELATED APPLICATIONS

This application claims priority to European Patent Application No. 12 173 636.7, filed Jun. 26, 2012 and to U.S. Provisional Patent Application No. 61/664,295, filed Jun. 26, 2012, which are each incorporated herein by reference in their entirety.

TECHNICAL FIELD

The technical field relates to passenger cabins of mobile platforms. In particular, the technical field relates to a floor panel for a floor of a passenger cabin of a mobile platform, to a floor panel arrangement for a passenger cabin of a mobile platform and to a mobile platform comprising at least one such floor panel or floor panel arrangement.

BACKGROUND

U.S. Pat. No. 8,366,042 and DE 10 2008 060 550 B3 describe an arrangement for installing electric cables in the floor region of an aircraft, comprising an elongate extruded profile arranged in a groove-shaped recess of a floor panel featuring an elongate drawer for transmitting shearing forces and an elongate cable shaft for accommodating electric cables that is arranged above the drawer.

The elongate extruded profile consists of an aluminium alloy and does not only serve to accommodate cable but also adds to the mechanical stability of the arrangement.

Other objects, desirable features and characteristics will become apparent from the subsequent summary and detailed description, and the appended claims, taken in conjunction with the accompanying drawings and this background.

SUMMARY

According to various embodiments, the present disclosure provides for a floor panel with integrated cable channel and reduced thickness.

According to one of various aspects of the present disclosure, a floor panel for a floor of a passenger cabin of a mobile platform is provided. The floor panel comprises a base body and a cover element. The base body has a cable channel which is integrated in the base body and the extents along a longitudinal direction of the base body for accommodating electric cables. For example, the cable channel extends along the entire length of the base body.

The cover element is adapted for being arranged on top of the cable channel and on top of a part of the top surface of the base body. This cover element serves for covering the cable channel. It can be firmly attached to the base body and is adapted to support the floor panel with respect to flow of forces, thereby adding to its stability.

The base body may be realized in the form of a sandwich component that includes two honeycomb structures, the first honeycomb structure extending from a left edge of the base body to a left side of the cable channel and the second honeycomb structure extending from a right edge of the base body to a right side of the cable channel.

In other words, the two honeycomb structures are arranged side by side and may even lie in the same plane. Between the two honeycomb structures, the cable channel is located.

By firmly attaching the cover element to the base body and by arranging the cover element on top of the top surface of the base body the floor panel may be of a comparatively slim design and may be less thick than other floor panels which comprise cable channels. Thus, an easy introduction in flying aircrafts may be possible. No changes of aircraft systems, such as electric or hydraulic systems, which are located underneath the floor panels may be necessary. Advantageously, the floor panel fits in different positions and in different orientation into an aircraft cabin. For example, the cable channel can easily be shifted sideways by simply rotating the base body by about 180° around its vertical axis. If the floor panel is arranged between two seat tracks, the cable channel may thus be moved from the left seat track, or vice versa.

Thus, a redesign of the cabin may be performed more easily.

Since the cover element not only serves for covering the cable channel but also provides mechanical stability since it is firmly fixed to the floor panel base body and can thus transfer forces which are created when a person walks over the floor panel, the weight of the floor panel may be smaller than the weight of comparable floor panels.

According to an exemplary embodiment of the present disclosure, the floor panel is self-supporting when it is supported along its left and right edges only, if the cover element is attached to the base body.

In other words, is the floor panel integrated in the passenger cabin of the mobile platform and attached to structural elements of the fuselage of the mobile platform, such as, for example seat tracks, it is self-supporting in case the cover element is attached to the base body, even if the floor panel is only supported in the region of its left and right edges only.

For example, the cover element is a planar cover element, and may be a sheet of metal. It is adapted to be placed on top of the opening of the cable channel and does not necessarily extend into the cable channel.

According to another exemplary embodiment of the present disclosure, both honeycomb structures share a common top cover layer and a common bottom cover layer, wherein the bottom of the cable channel is formed by the top cover layer and the bottom cover layer.

According to another exemplary embodiment of the present disclosure, the floor panel is adapted for being arranged between a first seat rail (also referred to as seat track) and a second seat rail which is parallel to the first seat rail. The base body, according to this exemplary embodiment, comprises a first attachment region parallel and adjacent to the left edge of the base body for attachment to the first seat rail. The base body also comprises a second attachment region parallel and adjacent to the right edge of the base body for attachment to the second seat rail.

Furthermore, according to another exemplary embodiment of the present disclosure, the top cover layer includes a first carbon fibre reinforced plastic layer comprising parallel arranged fibres having longitudinal axes in a first direction, and a second carbon fibre reinforced plastic layer comprising parallel arranged fibres having a longitudinal axis in a second direction, which is different from the first direction. For example, the angle between the two directions is about 90°, about positive (+) 45° or about negative (−) 45°.

Of course, the top cover layer may include further layers of carbon fibre reinforced plastic layers and/or glass fibre reinforced plastic layers.

According to another exemplary embodiment of the present disclosure, the bottom cover layer includes a plurality of carbon fibre reinforced plastic layers. Of course, one or more additional layers may be provided, for example glass fibre reinforced plastic layers.

According to another exemplary embodiment of the present disclosure, the floor panel comprises at least one primary coil for a wireless transmission of electric signals from the primary coil to a receiver of an electric consumer.

This electric consumer may, for example, be an entertainment device integrated in a passenger seat.

For example, the at least one primary coil is integrated in the cable channel of the base body or in the cover element.

According to another one of various aspects of the present disclosure, a floor panel arrangement for a passenger cabin of a mobile platform is provided, the arrangement comprising a first floor panel and a second floor panel, as described above and below. Further, the arrangement comprises a connecting element connecting the first floor panel to the second floor panel. The connecting element has a flat middle region which is positioned in the cable channels of the two floor panels on top of and adjacent to the top cover layers of the two floor panels.

According to another one of various exemplary embodiments of the present disclosure, the connecting element further comprises a left side portion and a right side portion arranged between the first floor panel and the second floor panel. For example, both the left side portion and the right side portion may be flat elements protruding from a corresponding rim of the flat middle region of the connecting element, wherein the flat middle region of the connecting element has a surface normal perpendicular to the surface normals of the left and right side portions.

According to another of various aspects of the present disclosure, a mobile platform is provided which comprises a passenger cabin with an above and below described floor panel and/or floor panel arrangement.

According to another exemplary embodiment of the present disclosure, the mobile platform is an aircraft, such as a helicopter or an airplane. It may also be a train, a bus, a truck or other land vehicle, or a ship, submarine or hovercraft.

One advantage of the present disclosure may be seen in that an electrical system is integrated into a mechanical primary structure of an aircraft, especially in floor plates that are arranged between seat rails, such that applicable aircraft-specific regulations are fulfilled. The installation of a plurality of electric data and supply cables from one seat to another seat, for example, a seat that is situated directly adjacent in the longitudinal direction of the aircraft, is significantly simplified. This type of seat-to-seat cabling may serve, for example, for supplying electric connecting elements assigned to passenger seats or entertainment systems integrated into passenger seats.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1A shows a cross-sectional view of a part of a floor panel according to one of various exemplary embodiments of the present disclosure.

FIG. 1B shows an enlarged view of first region of the cross-section of FIG. 1A.

FIG. 1C shows an enlarged view of a second region of the cross-section of FIG. 1A.

FIG. 1D shows an enlarged view of a further region of the cross-section of FIG. 1A.

FIG. 1E shows an enlarged view of a further region of the cross-section of FIG. 1A.

DETAILED DESCRIPTION

Figure 2:
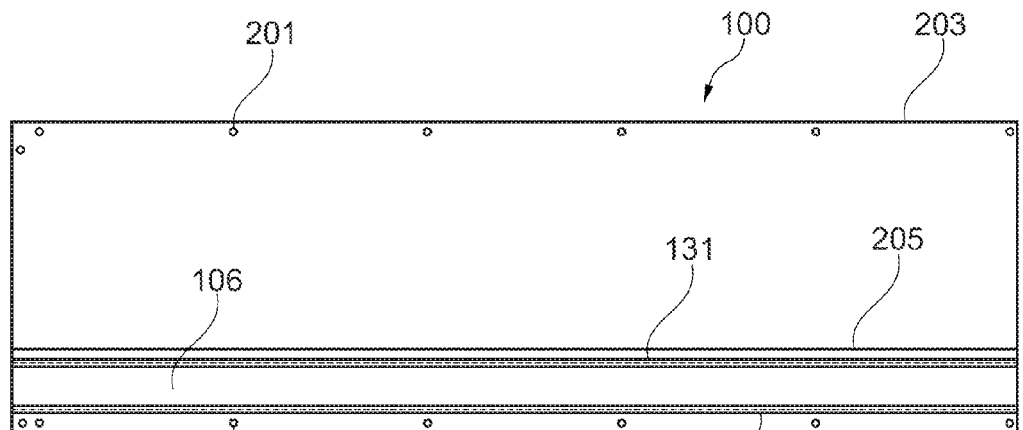
FIG. 2 shows a top view of a floor panel according to an exemplary embodiment of the present disclosure.

The following detailed description is merely exemplary in nature and is not intended to limit the present disclosure or the application and uses of the present disclosure. Furthermore, there is no intention to be bound by any theory presented in the preceding background or the following detailed description.

FIG. 1A shows a cross-sectional view of a part of a base body 100 of a floor panel according to an exemplary embodiment of the present disclosure. The base body is realized in the form of a sandwich component with a first honeycomb structure 103 and a second honeycomb structure 104, between which a cable channel 106 is arranged. Both honeycomb structures 103, 104 share a common top cover layer 101 and a common bottom cover layer 102. For example, the top cover layer 101 comprises two layers of carbon fibre reinforced plastic. Of course, additional layers of carbon fibre reinforced plastic and/or glass fibre reinforced plastic may be provided.

The bottom cover layer 102 comprises two or more layers of carbon fibre reinforced plastic, for example 8 or 10 layers.

The top cover layer 101 and the bottom cover layer 102 of the two honeycomb structures 103, 104 generally meet each other in the region of the cable channel 106 to form the bottom 105 of the cable channel.

FIG. 1B shows a more detailed view of the section 120 of FIG. 1A. It can be seen that the bottom cover layer 102 comprises 10 individual carbon fibre reinforced plastic layers which are arranged in a step-wise manner such that the bottom cover layer is relatively thin at the left and right edges of the floor panel base body, with an increasing thickness towards the cable channel 106. In other words, at the left and right sides of the base body the bottom cover layer 102 may comprise only two layers of carbon fibre reinforced plastic, whereas the bottom 105 of the cable channel comprises about 8 or about 10 layers, for example.

The ratio of the width of the steps 121 and the height may be about 20:1. In one example, the direction of the fibres of the different layers of the bottom cover layer may be 0/90/45/0/−45/−45/0/45/0/90°.

In case the cover element is a carbon fibre reinforced plastic layer structure, it may comprise about 6 layers with fibre directions 90/0/45/−45/0/90°.

It should be noted that the direction 0° runs along the longitudinal axis of the base body, i.e., in the direction of the cable channel.

FIG. 1C shows section 130 of FIG. 1A, i.e., the left transition between the section of the base body which comprises the first honeycomb structure, and cable channel. It can be seen, that the two upper cover layers 132 of the bottom cover layer 102 terminate at the end of the honeycomb structure 103 and do not form part of the bottom 105 of the cable channel.

FIG. 1D shows an enlarged cross-sectional view of the other side of the cable channel, which is designed in a similar way as the side depicted in FIG. 1C. It should be noted that, again, the two upper layers 142 of the bottom cover layer 102 terminate at the end of the second honeycomb structure 104 and do not form part of the bottom 105 of the cable channel.

FIG. 1E shows a detailed view of the area 150, depicted in FIG. 1A.

Figure 17:
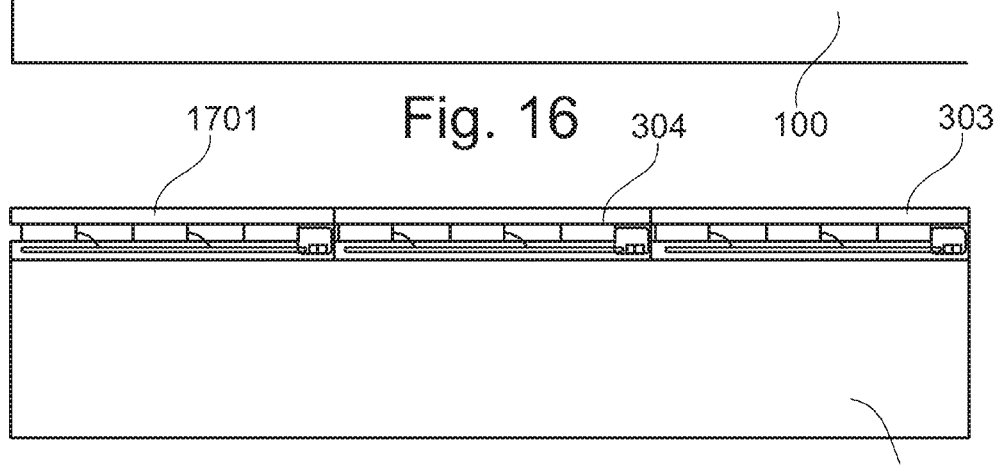
FIG. 17 shows a floor element with three covers, according to an exemplary embodiment of the present disclosure.

The size of the cable channel 106 may be adjusted to get a contactless power system implemented, as depicted in FIG. 17, for example.

In one example, the base body 100 may be fabricated in one piece.

FIG. 2 shows a base body 100 in top view. It has a left edge 203 and a right edge 204. The cable channel 106 is arranged next to the right edge 204. Along the edges 203, 204, attachment means can be provided in order to attach the floor panel to structural components of the mobile platform, for example seat rails.

For example, the base body 100 is screwed to the seat rails.

Areas 131 and 141, which can be seen in FIGS. 1C and 1D, where the transition from the parts of the base body which comprise the honeycomb structures, to the cable channel take place, are denoted by reference numerals 131 and 141.

One or more cover plates may be arranged in the area between the right edge 204 and line 205.

Figures 3, 4:
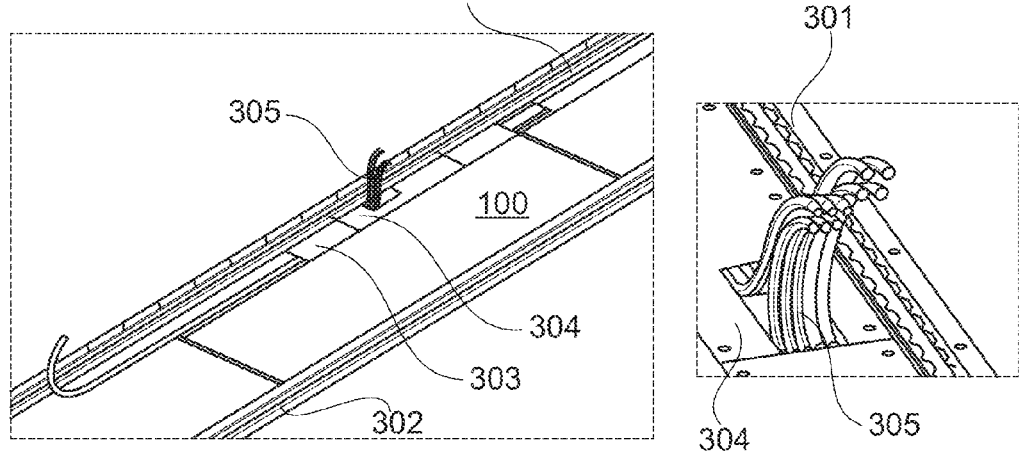
FIG. 3 shows a floor panel according to an exemplary embodiment of the present disclosure attached to two seat rails.
FIG. 4 shows a detailed view of a region of FIG. 3.

This is for example depicted in FIG. 3, in which the floor panel is arranged between two seat rails 301, 302 and attached thereto.

The floor plate is realized in the form of a sandwich component that comprises a honeycomb structure with two outer cover layers and, wherein the honeycomb structure may comprise plastic and the cover layers and may comprise plastic that is reinforced with carbon fibers or glass fibers. For example, these outer cover layers may comprise a carbon fibre reinforced plastic (CFK)-layer that is situated adjacent to the honeycomb structure, a central CFK-layer and an outer glass fibre reinforced plastic (GFK)-layer. The floor plate is arranged between the seat rails that extend parallel to one another in the longitudinal direction of the aircraft and serve for attaching seat legs of one or more passenger seat(s) by means of conventional tongue and groove clamping connections. It may have a width, for example, of about 490 mm between the seat rails while its length may extend over one seat or several seats that are arranged behind one another in the longitudinal direction of the aircraft. In its central region, the honeycomb structure of the sandwich component may have a predetermined, approximately rectangular cross section. The maximum thickness of the floor plate in the region of the honeycomb structures may be approximately 10 mm and in the region of the cable channel approximately 17 mm. The floor plate features an elongate groove-shaped recess that is arranged in the immediate vicinity of the seat rail and extends parallel to the seat rail in the longitudinal direction of the aircraft.

The elongate opening of the cable channel is closed by means of an elongate cover 303, 304. If the cover is made of aluminum it may be advantageous to apply a non-conductive layer that is not graphically illustrated on the aluminum surface of the cover. The insulating layer may comprise glass fiber-reinforced plastic. It would also be possible for the upper cover layer or the outer GFK-layer of this cover layer to extend through the cable channel 2 as an insulating layer. Sealing means may advantageously be provided between the adjoining surfaces of the cover and the cable shaft in order to realize a protection against moisture and unauthorized access.

Several covers lie behind one another edge-to-edge over the entire length of the groove-shaped recess that corresponds to the seat rail length.

Several cover elements 303, 304 are attached to the base body 100, thereby closing the cable channel.

Some of the cover elements comprise a cut-out (see FIG. 4) through which cables 305 exit the cable channel. As may also seen from FIGS. 3 and 4, the various cover elements 303, 304 are attached to the base body 100 by screws or other suitable attachment means. Advantageously, the attachment means can be opened in order to remove the respective cover element for gaining access to the cable channel.

It is also possible, that the cover elements comprise a hinge element such that they can be flapped open when the attachment means on the other side is removed in order to gain access to the cable channel.

Figure 5:
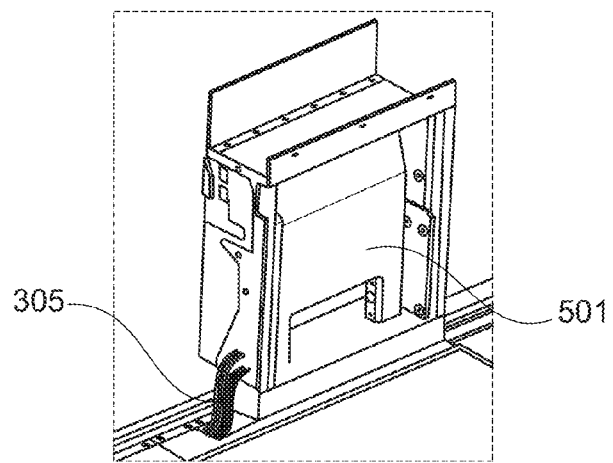
FIG. 5 shows a shroud positioned on top of a seat rail and the floor panel.

FIG. 5 shows a shroud 501 attached to the floor panel into which the cables 305 lead.

Figure 6:
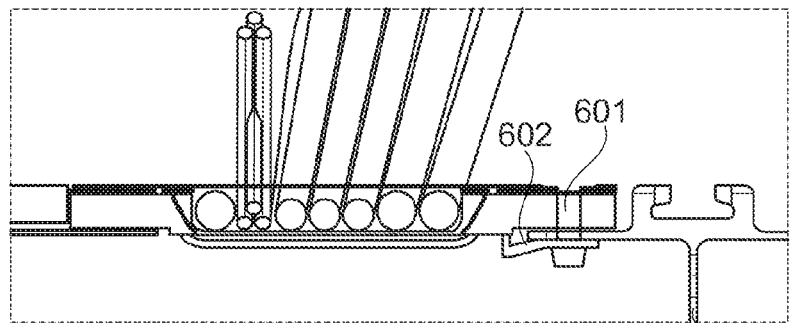
FIG. 6 shows a partial cross-sectional view of a floor panel attached to a seat rail, according to an exemplary embodiment of the present disclosure.

FIG. 6 shows a cross-sectional view of a seat rail 301 and the right side of floor panel, attached to the seat rail.

Attachment to the seat rail may be by means of a screw 601 and a corresponding nut 602.

The screw 601 may be inserted from the top and the nut is arranged at a downward facing surface of the seat rail 301.

Figure 7:
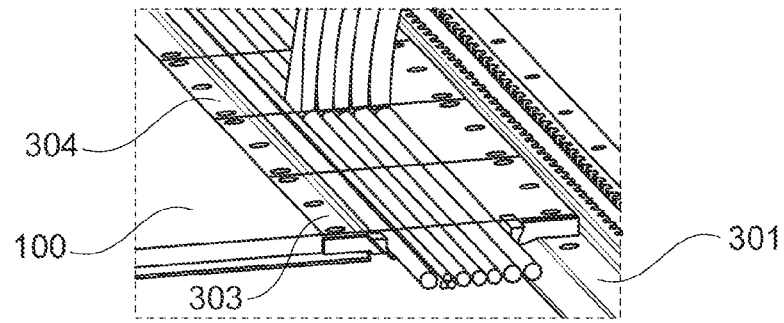
FIG. 7 shows a view of the floor panel of FIG. 6.

FIG. 7 shows the floor panel attached to the seat rail seen from another direction. The cover elements 303, 304 may be in the form of aluminum plates or carbon fibre reinforced plastic plates, which are screwed to the base body 100.

Figure 8:
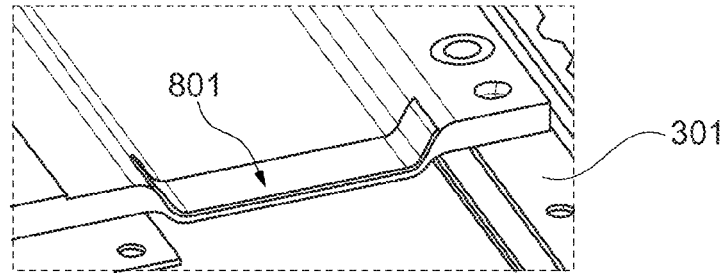
FIG. 8 shows the floor panel of FIG. 7 without cover.
Figure 9:
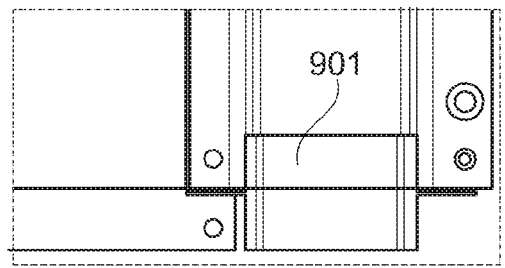
FIG. 9 shows a top view of a floor panel with a connecting element.

FIG. 8 shows an end section of a base body 100, wherein a sealing tape, for example a Teflon tape, is provided on the top surface of the cable channel for providing a seal between the cable channel and the connecting element 901 (see FIG. 9).

Figure 10:
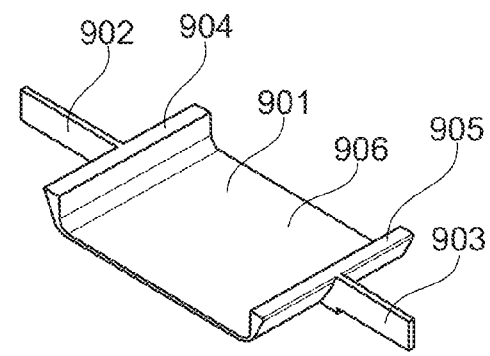
FIG. 10 shows a connecting element according to an exemplary embodiment of the present disclosure.

FIG. 10 shows a connecting element 901 used for connecting two base bodies with each other. The connecting element 901 comprises a central, flat region 906 which is adapted to be positioned in the cable channels of the two floor panels on top of and adjacent to the top cover layers 101 of the floor panels. This middle region 906 has a left rim 904 and a right rim 905, from which the left and right side portions 902, 903 protrude. These side portions 902, 903 have a surface orientation in the direction of the longitudinal axis of the cable channel such that they can be arranged between the two floor panels.

Figure 11:
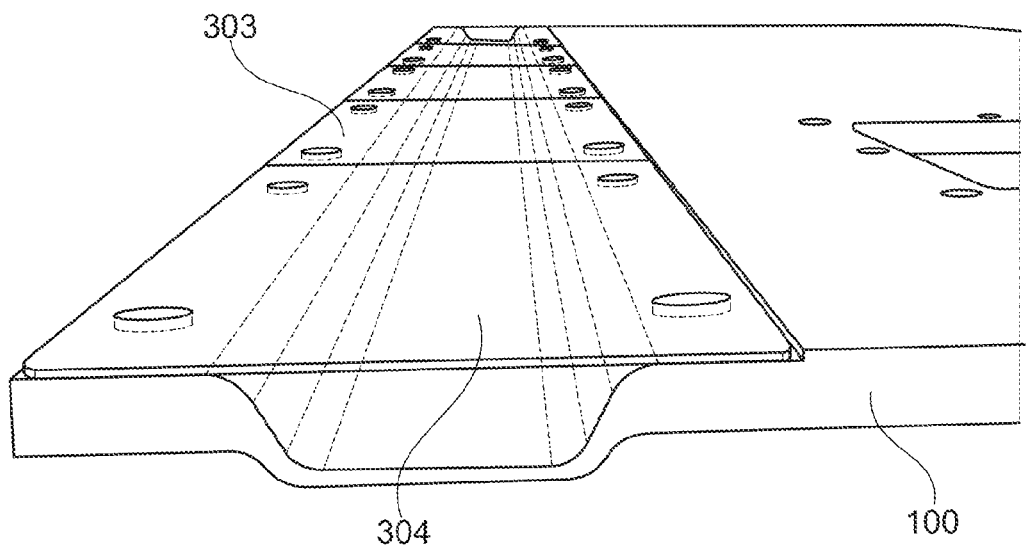
FIG. 11 shows a floor panel with a plurality of cover elements, according to an exemplary embodiment of the present disclosure.

FIG. 11 shows a part of a base body with cover elements 303, 304 attached thereto.

Figure 12:
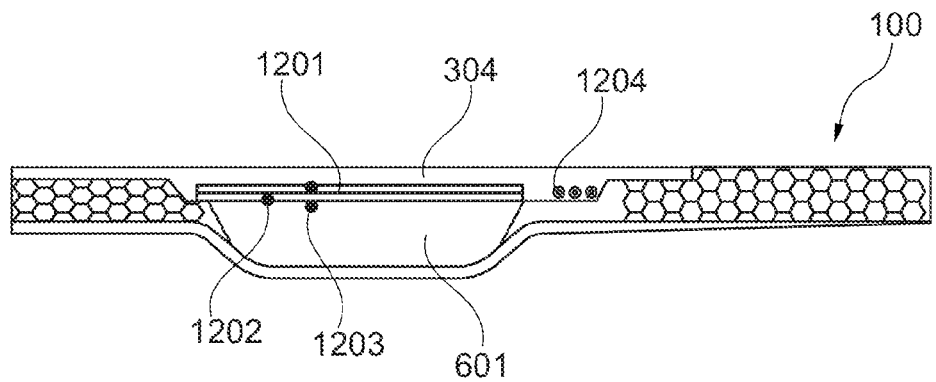
FIG. 12 shows a cross-sectional view of a part of a floor panel according to an exemplary embodiment of the present disclosure.

FIG. 12 shows a cross-sectional view of the cable channel 601 integrated in the base body 100 with a cover element 304. Below the cover element 304, primary coils in PCB technology 1201 are provided. Below the primary coils 1201, ferrite material 1202 may be provided, in form of a layer. Below that ferrite material layer a cover sheet 1203 is arranged to provide mechanical protection of the ferrite material layer and the primary coil. All this may be integrated in the cover element 304. Furthermore, a bracket-internal-wiring 1204 may be provided to connect the different primary coils to an interface.

Figure 13:
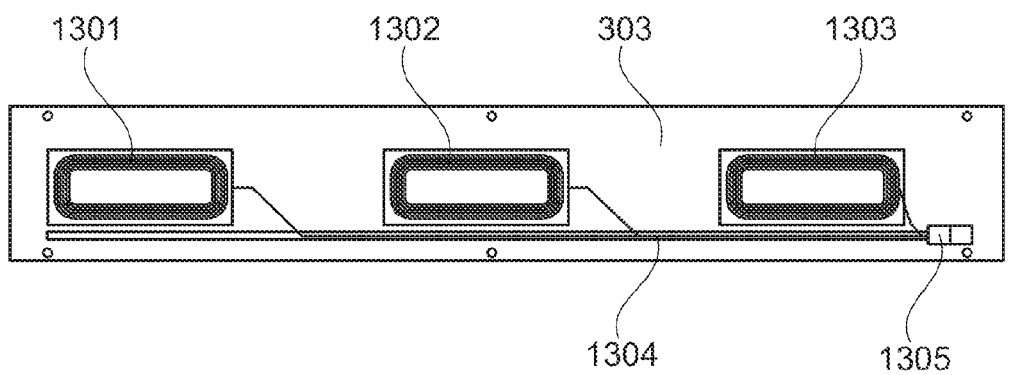
FIG. 13 shows a cover element with integrated primary coils, according to an exemplary embodiment of the present disclosure.
Figure 14:
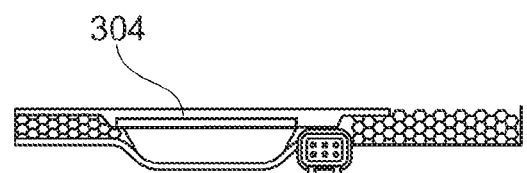
FIG. 14 shows part of a floor panel according to an exemplary embodiment of the present disclosure.
Figure 15:
FIG. 15 shows a cover element according to an exemplary embodiment of the present disclosure.

FIG. 13 shows a cover element with three primary coils 1301, 1302, 1303 attached thereto. The primary coils are connected to an interface 1305 by wires 1304.

Figure 18:
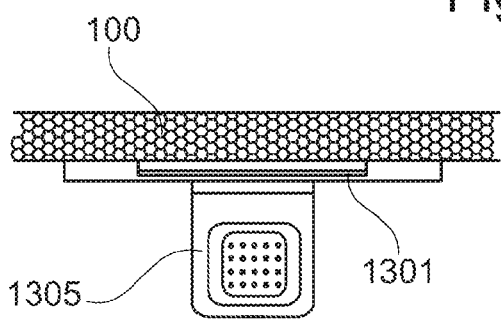
FIG. 18 shows a floor element with primary coil and electric interface.

FIGS. 14, 15, 18 and 19 show electric interfaces 1305 for connecting the primary coils with an external signal source. FIG. 18 shows an angled connector for PCT mounting. An advantage of this is a flat configuration.

Figure 19:
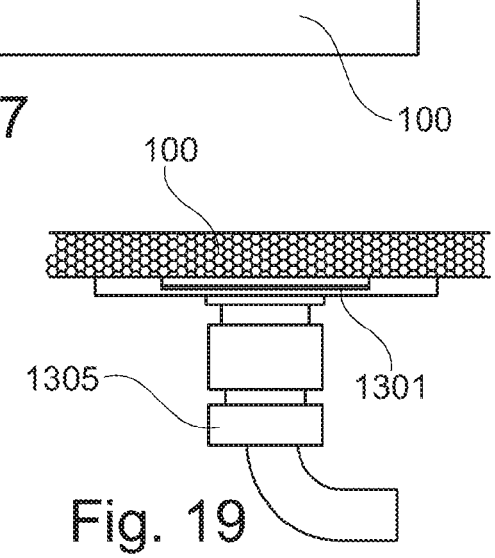
FIG. 19 shows a floor element with primary coil and another exemplary electric interface.

FIG. 19 shows a straight connector 1305.

Figure 16:
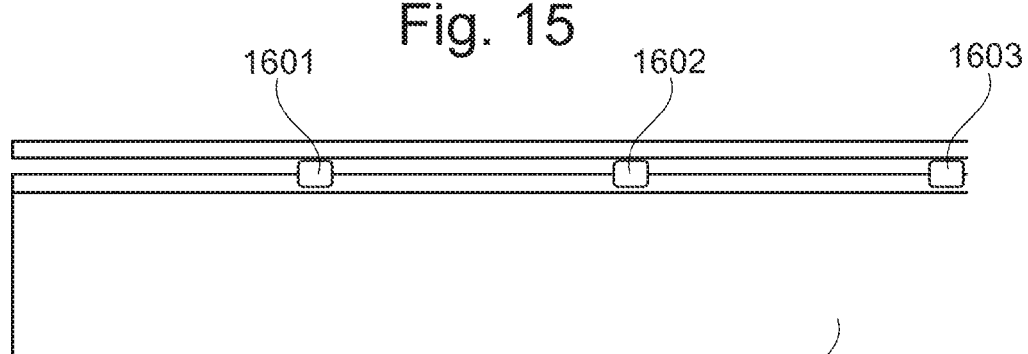
FIG. 16 shows a floor element without cover, according to an exemplary embodiment of the present disclosure.

FIG. 16 shows a base body 100 with recesses 1601, 1602, 1603 arranged in the area of the cable channel for receiving the interfaces 1305 of the primary coils when the cover elements are attached to the base body. Therefore, the interfaces 1305 can be connected to a signal source on the bottom side of the floor plate.

As can be seen from FIG. 17, three primary coils may be provided for each cover element 303, 304, 1701. The primary coils are arranged one behind the other along the longitudinal direction of the cover elements and, when the cover elements are attached to the floor plate, above or at least partially inside the cable channel of the floor plate.

Figure 20:
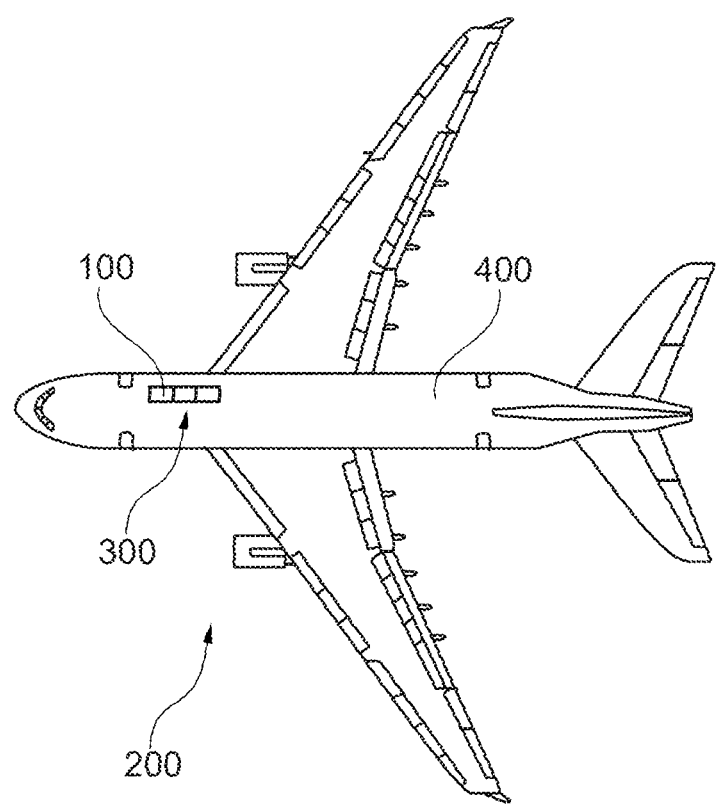
FIG. 20 shows an aircraft with a plurality of floor panels, according to an exemplary embodiment of the present disclosure.

FIG. 20 shows an aircraft 200, which comprises a passenger cabin 400 with a floor panel arrangement 300 comprising a plurality of base bodies 100 and cover elements.

The floor panel arrangement is for example arranged between two seat rails.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A floor panel for a floor of a passenger cabin of a mobile platform, the floor panel comprising:

a base body having a cable channel extending along a longitudinal direction of the base body for accommodating electric cables; and a planar cover element arranged on top of the cable channel and a part of the top surface of the base body for covering the cable channel, the cover element firmly attached to the base body at positions left and right of the cable channel;

wherein the base body comprises a sandwich component that includes a first honeycomb structure and a second honeycomb structure, the first honeycomb structure extending from a left edge of the base body to a left side of the cable channel and the second honeycomb structure extending from a right edge of the base body to a right side of the cable channel, the cable channel being arranged between the first and second honeycomb structures;

wherein both the first honeycomb structure and the second honeycomb structure share a common top cover layer and a common bottom cover layer;

wherein the top cover layer and the bottom cover layer meet each other in the region of the cable channel to form the bottom of the cable channel; and wherein the floor panel is self-supporting when being supported along its left and right edges only if the cover element is attached to the base body.

2. The floor panel of claim 1, wherein the cover element is a metal sheet.

3. The floor panel of claim 1, wherein the floor panel is arranged between a first seat rail and a second seat rail which is parallel to the first seat rail, and the base body comprises a first attachment region parallel and adjacent to the left edge of the base body for attachment to the first seat rail and a second attachment region parallel and adjacent to the right edge of the base body for attachment to the second seat rail.

4. The floor panel of claim 1, wherein the top cover layer includes a first carbon fibre reinforced plastic layer comprising parallel arranged fibres having longitudinal axes in a first direction and a second carbon fibre reinforced plastic layer comprising parallel arranged fibres having longitudinal axes in a second direction, which is different from the first direction.

5. The floor panel of claim 1, wherein the bottom cover layer includes a plurality of carbon fibre reinforced plastic layers.

6. The floor panel of claim 1, further comprising:

at least one primary coil for a wireless transmission of electric signals from the primary coil to a receiver of an electric consumer.

7. The floor panel of claim 6, wherein the electric consumer is an entertainment device integrated in a passenger seat.

8. The floor panel of claim 6, wherein the at least one primary coil is integrated in the cable channel or in the cover element.

9. A floor panel arrangement for a passenger cabin of a mobile platform, the arrangement comprising:

a first floor panel and a second floor panel, at least one of the first floor panel and the second floor panel including a base body having a cable channel extending along a longitudinal direction of the base body for accommodating electric cables, and a planar cover element arranged on top of the cable channel and a part of top surface of the base body for covering the cable channel, the cover element attached to the base body at positions left and right of the cable channel, the base body comprising a sandwich component that includes a first honeycomb structure and a second honeycomb structure, the first honeycomb structure extending from a left edge of the base body to a left side of the cable channel and the second honeycomb structure extending from a right edge of the base body to a right side of the cable channel, the cable channel being arranged between the first and second honeycomb structures, both of the first honeycomb structure and the second honeycomb structure sharing a common top cover layer and a common bottom cover layer, wherein the top cover layer and the bottom cover layer meet each other in the region of the cable channel to form the bottom of the cable channel; and a connecting element connecting the first floor panel to the second floor panel, the connecting element including:

a flat middle region which is positioned in the cable channel of the first floor panel and the cable channel of the second floor panel on top of and adjacent to the top cover layers of the first floor panel and the second floor panel respectively, wherein the at least one floor panel is supported along its left and right edges when the cover element is attached to the base body.

10. The floor panel arrangement of claim 9, the connecting element further comprising:

a left side portion and a right side portion arranged between the first floor panel and the second floor panel.

11. A mobile platform, comprising:

a cabin with at least one floor panel that includes a base body having a cable channel extending along a longitudinal direction of the base body for accommodating electric cables, and a planar cover element arranged on top of the cable channel and a part of top surface of the base body for covering the cable channel, the cover element coupled to the base body, wherein the base body comprises a sandwich component that includes a first honeycomb structure and a second honeycomb structure, the first honeycomb structure extending from a left edge of the base body to a left side of the cable channel and the second honeycomb structure extending from a right edge of the base body to a right side of the cable channel, the cable channel being arranged between the first and second honeycomb structures, and both the first honeycomb structure and the second honeycomb structure share a common top cover layer and a common bottom cover layer, wherein the top cover layer and the bottom cover layer meet each other in the region of the cable channel to form the bottom of the cable channel, and wherein the at least one floor panel is self-supporting when supported along its left and right edges when the cover element is attached to the base body.

12. The mobile platform of claim 11, wherein the mobile platform is an aircraft.

13. The mobile platform of claim 11, further comprising:

at least one primary coil for a wireless transmission of electric signals from the primary coil to a receiver of an electric consumer.

14. The mobile platform of claim 13, wherein the electric consumer is an entertainment device integrated in a passenger seat of the mobile platform.

15. The mobile platform of claim 13, wherein the at least one primary coil is integrated in the cable channel or in the cover element.

* * * * *